United States Patent

Urbanek et al.

[11] Patent Number: 5,855,963
[45] Date of Patent: Jan. 5, 1999

[54] PROCESS FOR THE PRODUCTION OF A COATING ON THE SURFACE OF PLASTICIZING SCREWS FOR INJECTION MOLDING MACHINES

[75] Inventors: Otto Urbanek, Linz; Peter Baldinger, Enns, both of Austria

[73] Assignee: Engel Machinenbau Gesellschaft M.B.H., Schwertberg, Austria

[21] Appl. No.: 849,928

[22] PCT Filed: Oct. 3, 1996

[86] PCT No.: PCT/AT96/00182

§ 371 Date: May 30, 1997

§ 102(e) Date: May 30, 1997

[87] PCT Pub. No.: WO97/13001

PCT Pub. Date: Apr. 10, 1997

[30] Foreign Application Priority Data

Oct. 4, 1995 [AT] Austria ................................. 1641/95

[51] Int. Cl.$^6$ ....................................... C23C 4/12
[52] U.S. Cl. ................. 427/448; 427/453; 427/455; 427/456
[58] Field of Search ................... 427/448, 453, 427/455, 456

[56] References Cited

U.S. PATENT DOCUMENTS

| 4,233,072 | 11/1980 | Watanabe . | |
|---|---|---|---|
| 4,766,042 | 8/1988 | Otani | 428/679 |
| 5,135,378 | 8/1992 | Catton . | |
| 5,198,268 | 3/1993 | Grossman | 427/190 |

FOREIGN PATENT DOCUMENTS

| 0305142 | 8/1988 | European Pat. Off. . |
| 0430383 | 11/1990 | European Pat. Off. . |
| 0451512 | 3/1991 | European Pat. Off. . |
| 4130207 | 9/1991 | Germany . |
| 62-230962 | 1/1986 | Japan . |
| 62-204875 | 3/1986 | Japan . |
| 4014410 | 7/1990 | Japan . |
| 5-84807 | 4/1993 | Japan . |
| 576526 | 2/1973 | Switzerland . |
| 8703012 | 11/1986 | WIPO . |
| 8912115 | 6/1989 | WIPO . |

*Primary Examiner*—Katherine A. Bareford
*Attorney, Agent, or Firm*—Notaro & Michalos P.C.

[57] ABSTRACT

A process for producing a coating on the surface of a plastifier screw for injection molding machines includes applying to a hard-metallic or ceramic substrate with low distortion, a steel screw base element, by high-speed flame spraying. During the coating process, a spray jet treats the different surface regions of the screw base element including the flanks and top of a rib as well as the base of the screw, independently.

21 Claims, 6 Drawing Sheets

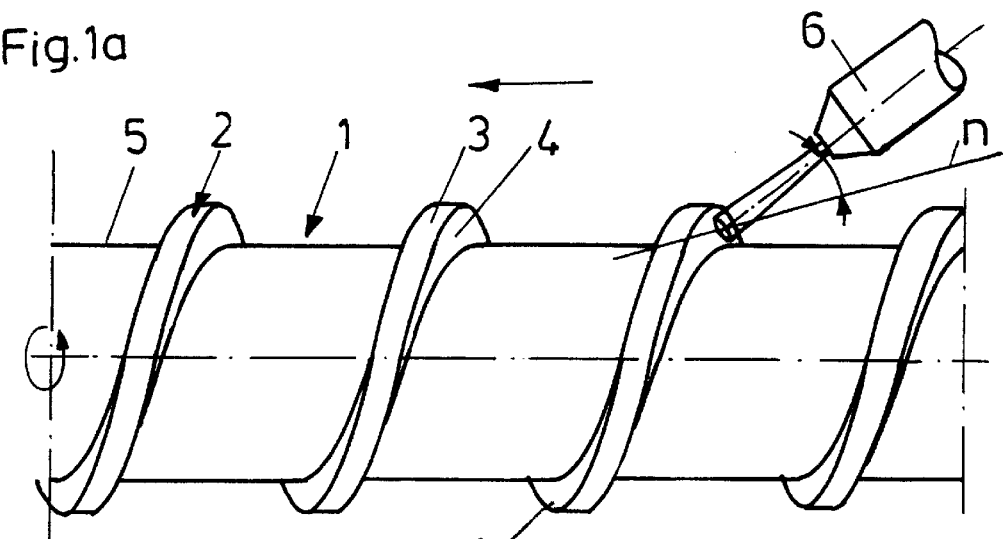
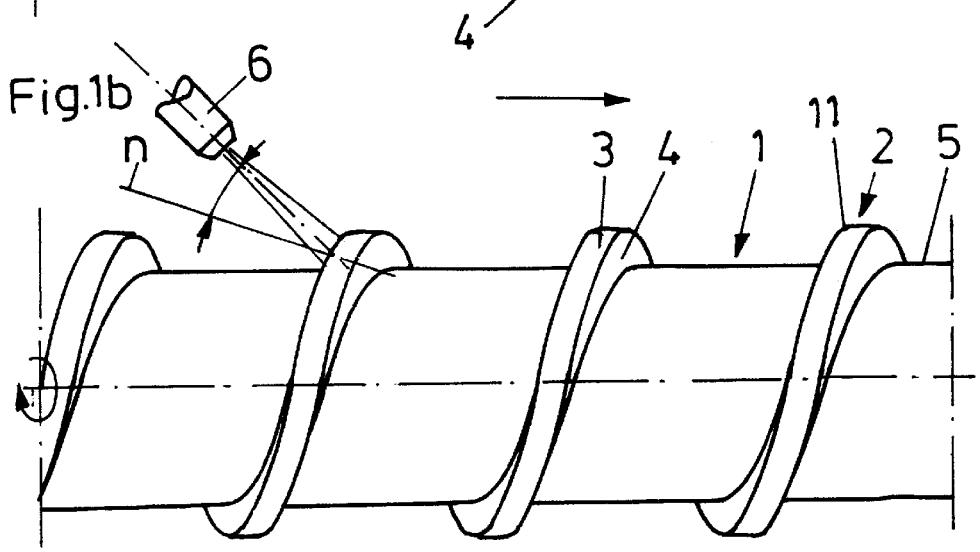
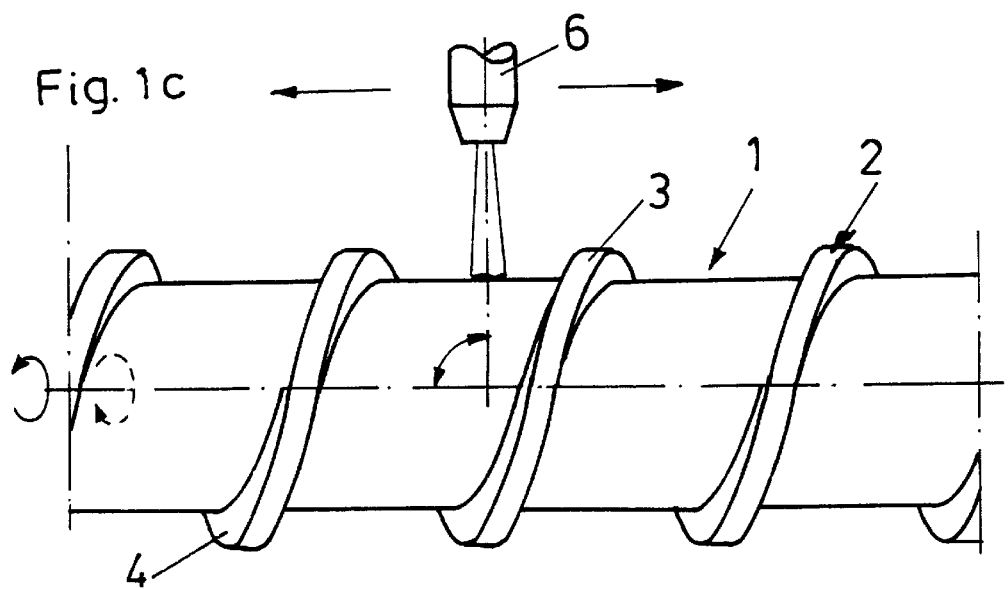

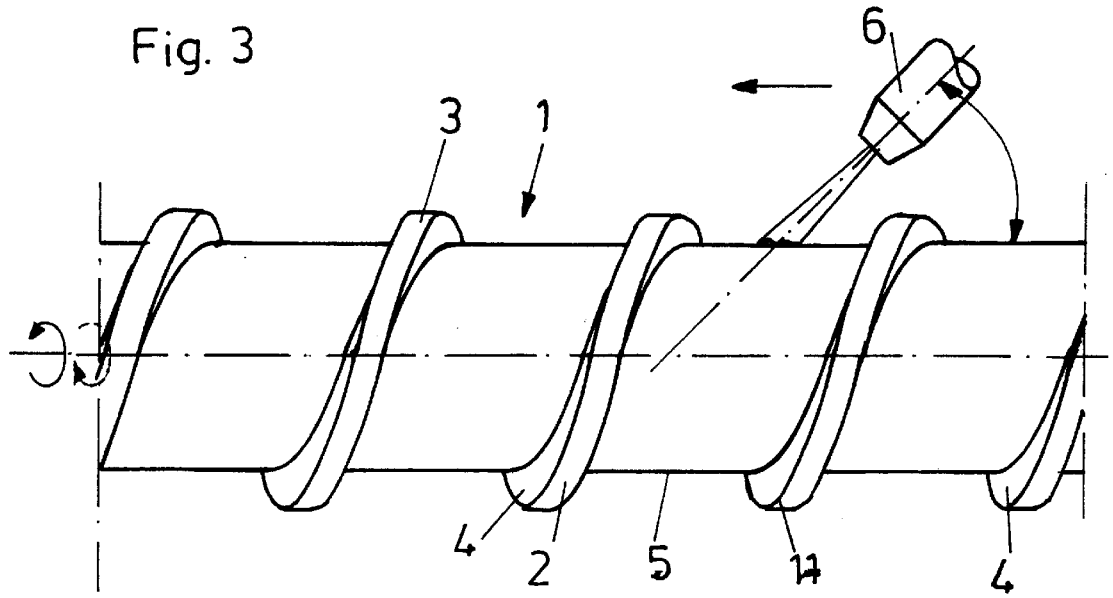
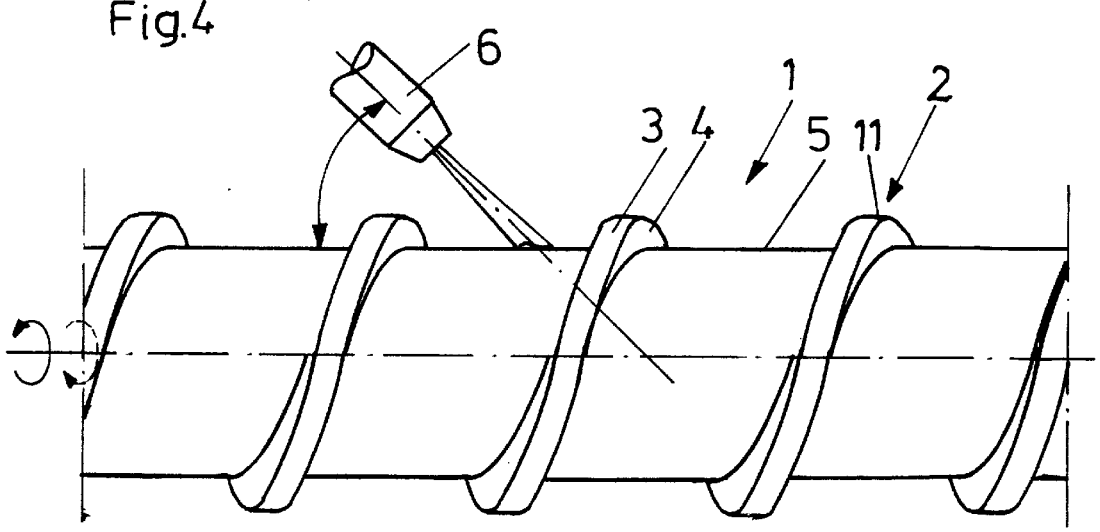

PROCESS FOR THE PRODUCTION OF A COATING ON THE SURFACE OF PLASTICIZING SCREWS FOR INJECTION MOLDING MACHINES

This is a national stage application of PCT/AT96/00182, filed Oct. 3, 1996.

FIELD AND BACKGROUND OF THE INVENTION

The invention relates to a process for producing a coating on the surface of plasticizing screws for injection molding machines, in which a metal, carbide-metal or ceramic material is applied with a low degree of distortion to a screw main body consisting of steel, by means of at least one spray jet using the high-speed flame spray process.

In order to improve the wear resistance of plasticizing screws, the conventional state of the art provides that the plasticizing screws are hardened or coated by means of flame spraying with subsequent heat treatment. Both can result in deformation of the screw, while in the case of flame spraying, cracks can occur in the coating in the subsequent operation of straightening the plasticizing screw. A plasticizing screw of that kind is therefore not resistant to corrosion.

SUMMARY OF THE INVENTION

An object of the present invention is to provide an improved process for coating plasticizing screws, by means of which it is possible to produce a wear-resistant and corrosion-resistant coating, which is operative to produce a conveyor effect, on the surface of the plasticizing screw.

The object in accordance with the invention is attained in that in the coating operation the spray jet acts on the various surface regions of the screw main body, namely the flight top side, the flight flanks and the screw bottom, partially independently of each other, a mechanical bond being made between the screw main body and the coating.

Therefore a fused bond is not made between the screw main body and the coating.

If a plasticizing screw is coated with the process according to the invention, there is no need for a subsequent heat treatment which could result in distortion of the plasticizing screw.

BRIEF DESCRIPTION OF THE DRAWINGS

Various embodiments of the invention are described hereinafter with reference to the Figures of the accompanying drawings.

FIG. 1a is a partial side elevational view showing the main body of the screw and spray jet with jet nozzle according to the present invention;

FIG. 1b is a view similar to FIG. 1a with the spray nozzle in a different position;

FIG. 1c is a view similar to FIG. 1a with the spray nozzle in a still further position;

FIG. 3 is a view similar to FIG. 1a with the spray nozzle in a further position;

FIG. 4 is a view similar to FIG. 3 with the spray nozzle in a different position;

DESCRIPTION OF THE PREFERRED EMBODIMENTS

Figure 2A:
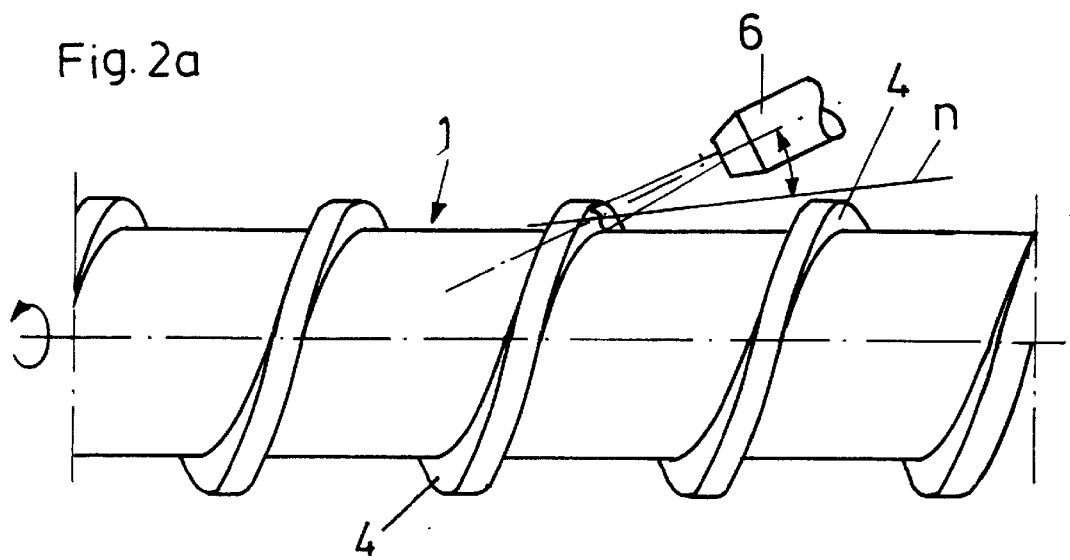
FIG. 2a is a view similar to FIG. 1 with the spray nozzle in a still further position.

The screw main body 1 which is made of steel has a screw flight 2. The screw flight 2 extends in a helical configuration around the screw main body 1. It has a flight top side 3 and two flight flanks 4. Disposed in the free space between the screw flight 2 is the screw bottom 5.

The pitch and/or configuration of the screw flight 2 varies over the length of the screw main body 1. This configuration of the plasticizing screw however is independent of the invention.

Coating of the entire screw surface 1 and the screw flight 2 is effected by means of a burner or torch nozzle 6 by means of which a spray jet of metal, hard-metal or carbide-metal, or ceramic material is applied to the screw main body 1 and the screw flight 2, using the high-speed flame spray process.

In that procedure the burner nozzle 6 is moved axially a plurality of times along the screw main body 1, with the screw main body 1 being rotated about its longitudinal axis. In the example of the process shown in FIGS. 1a through 1c the forward feed movement of the burner nozzle 6 corresponds to the pitch of the screw flight. The burner nozzle 6 is oriented at an angle A of 0°–60° relative to the line n normal to the flight flank 4 of the screw flight 2.

At each reversal point the burner nozzle 6 is pivoted in order to spray on to the oppositely disposed flight flank 4 of the screw flight 2, and likewise at each reversal point the direction of rotation of the screw main body 1 is changed.

After the flanks 4 of the screw flight 2 have been coated the screw bottom 5 and the top side 3 of the flight is coated, in which case, as shown in FIG. 1c, the burner nozzle is oriented at an angle of 90° relative to the longitudinal center line of the screw main body.

Figure 2B:
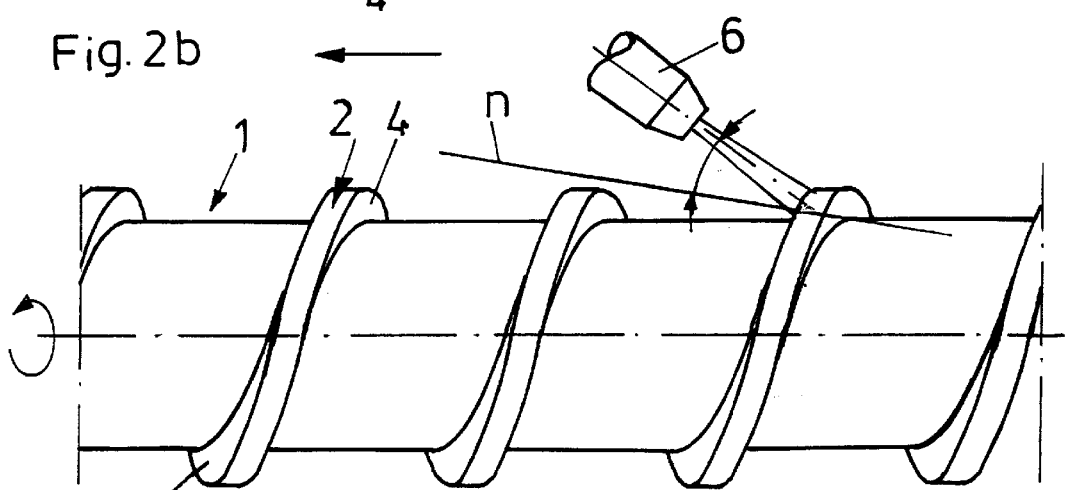
FIG. 2b is a view similar to FIG. 1a with the spray nozzle again in a different position.
Figure 2C:
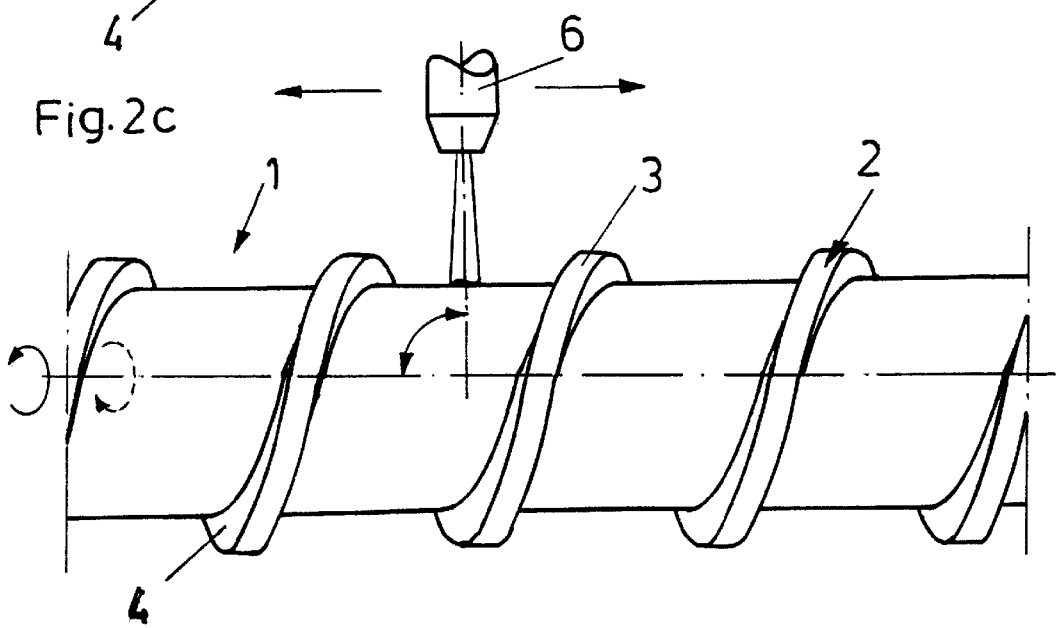
FIG. 2c is a view similar to FIG. 1a with the spray nozzle in a still further different position.

In the embodiment shown in FIGS. 2a through 2c the forward feed movement of the burner nozzle 6 again corresponds to the pitch of the screw flight and the burner nozzle 6 is again oriented at an angle of 0°–60° relative to the line n normal to the flanks 4 of the screw flight.

The screw main body 1 is rotated while the burner nozzle 6 is being moved axially. At the reversal points the burner nozzle is turned, as shown in FIGS. 2a and 2b. The direction of rotation of the screw main body 1 however is retained.

The burner nozzle 6 is moved over the screw main body 1 with working stroke motions in the same direction. Between two working stroke motions the burner nozzle 6 moves back in an idle condition into the starting position.

Coating of the screw bottom 5 and the top side 3 of the flight is again effected by means of a burner nozzle 6 which is oriented perpendicularly with respect to the longitudinal center line of the screw main body 1.

Figure 5:
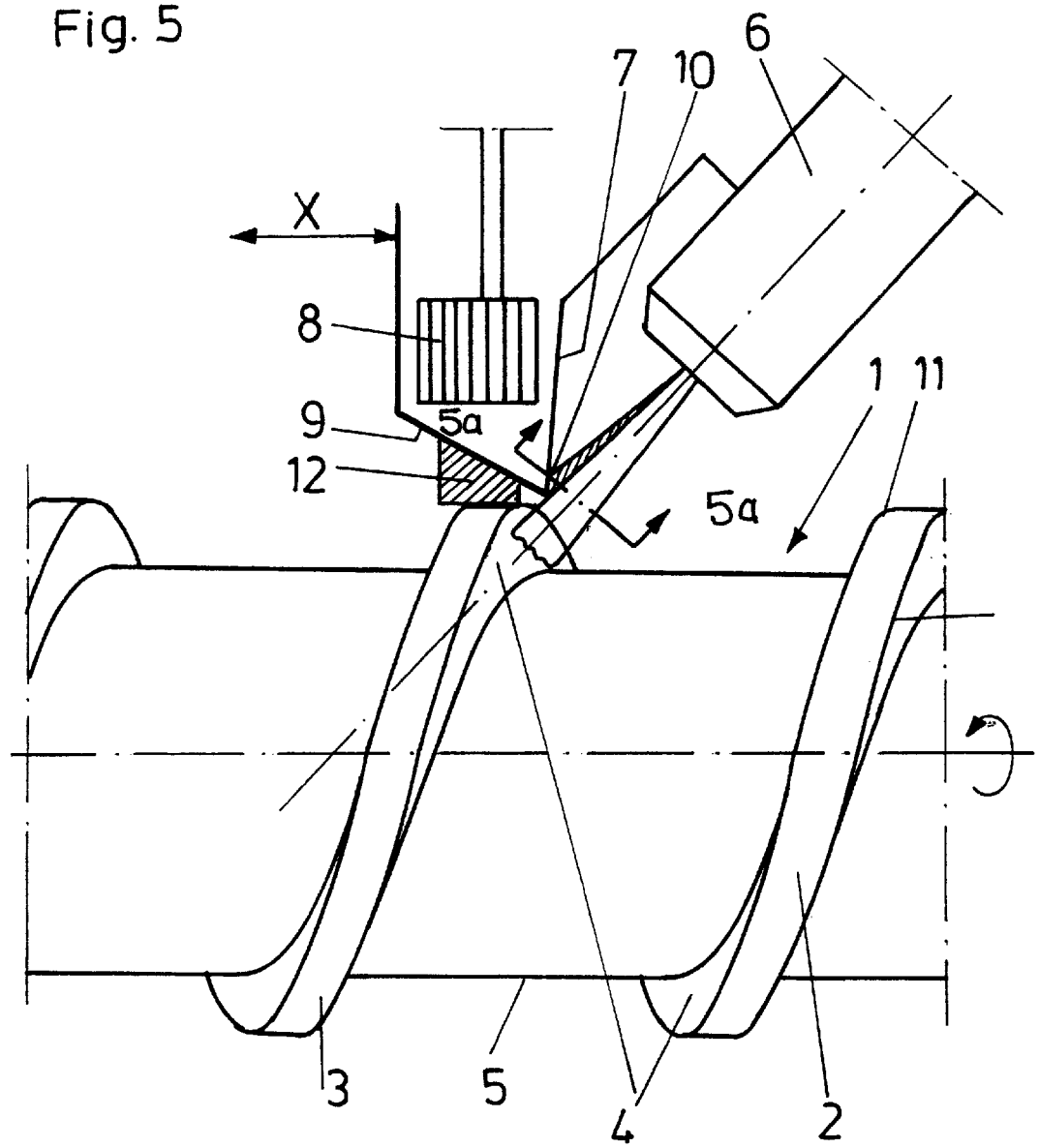
FIG. 5 is an enlarged partial side elevational view showing the main body of the screw with spray jet and spray nozzle with a shield system.
Figure 5A:
FIG. 5a is a sectional view through a spray jet taken along line 5a—5a of FIG. 5.
Figure 6:
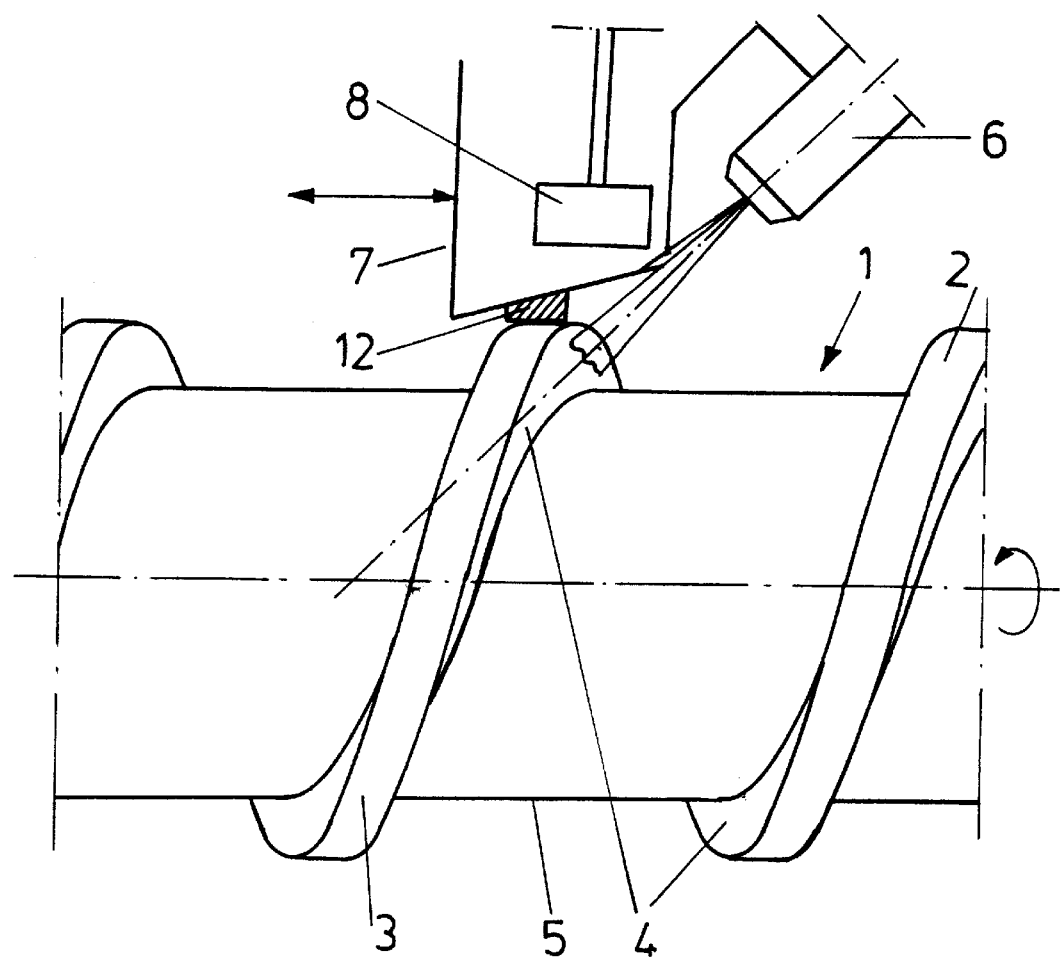
FIG. 6 is a view similar to FIG. 5 showing a different embodiment for the shield system.

In order to enhance the efficiency of coating on the flanks 4 of the screw flight, it is possible to use shields 7, as shown in FIGS. 5 and 6. The shields 7 are preferably of a box-like configuration and are fixed to the burner nozzle 6 or to a holder for the burner nozzle 6. Disposed within the shield 7 is a suction removal device 8 which sucks away the material which has passed into the shield 7.

The shields 7 are of a box-like configuration and have an inclined bottom 9 at which there is an opening 10 through which coating material can pass into the shield 7.

Advantageously the spacing between the bottom 9 of the shield 7 and the top side 3 of the screw flight 2 is filled by a silicone seal 12.

The shield 7 is moved together with the burner nozzle 6 axially along the screw flight 2 and is reversed with a pivotal movement together with the nozzle 6 at the reversal points.

FIGS. 3 and 4 show a further alternative configuration in regard to coating the entire screw main body 1. In that case the burner nozzle 6 is held at an angle of 15°–75° with respect to the longitudinal center line of the screw main body 1 and is again guided in the axial direction over the surface of the screw main body 1 during the rotary movement thereof. With that kind of coating operation the forward feed movement of the burner nozzle 6 is independent of pitch.

During the reciprocating movement of the burner nozzle 6 the direction of rotation of the screw main body can remain the same or it may also be changed at each of the reversal points of the burner nozzle 6.

In order to improve the adhesion of the coating material at the edges 11 of the screw flight 2 it is advantageously provided that the edges 11 are rounded or provided with bevels. The radii of rounded edges 11 are advantageously between 0.1 and 0.8 mm while the bevels are 0.1 through 3×30°–60°.

Before the actual high-speed flame spraying operation the screw main body 1 is advantageously cleaned in an ultrasonic bath or manually by means of alcohol solutions. A sand blasting process follows the cleaning procedure, iron-free electro-corundum of grain sizes of 0.3–1.5 mm being used as the blasting agent.

The coating operation is thermally regulated in such a way that the maximum workpiece surface temperatures that occur are 150° C. In that way only minimal distortion of the screw main body 1 occurs and a straightening process subsequent to the coating operation can be omitted.

Particularly suitable materials for the screw main body 1 are metal materials.

In accordance with the process of the invention one or more of the following materials are used as the coating materials: Mo, Cr, Ni, Ti, Al, Co, Nb, W, Co—Ni, Co—Cr, Cr—Ni and Co—Mo—Cr.

The thickness of the coating layer is between 0.1 and 0.8 mm, preferably between 0.2 and 0.4 mm.

Advantageously the coated surfaces are worked with diamond or CBN-tools, wherein the outside fits of the screw flight 2 are ground with a grinding wheel and the flight flanks 4 and the screw bottom 5 are ground with flexible bands or strips. Preferably at least three different grinding grain sizes are used.

The process according to the invention provides at the surface of the screw for minimum adhesion in relation to plastic materials, an optimum conveyor effect and a very good self-cleaning action for a wide range of plastic materials (preferably Ra-values of between 0.10 and 0.40 μm).

The plasticizing screws which are coated with the process according to the invention are subjected to torsional testing, in which case shear stresses of 180 N/mm$^2$ are induced at temperatures of 450° C. over at least 24 hours.

Figure 7:
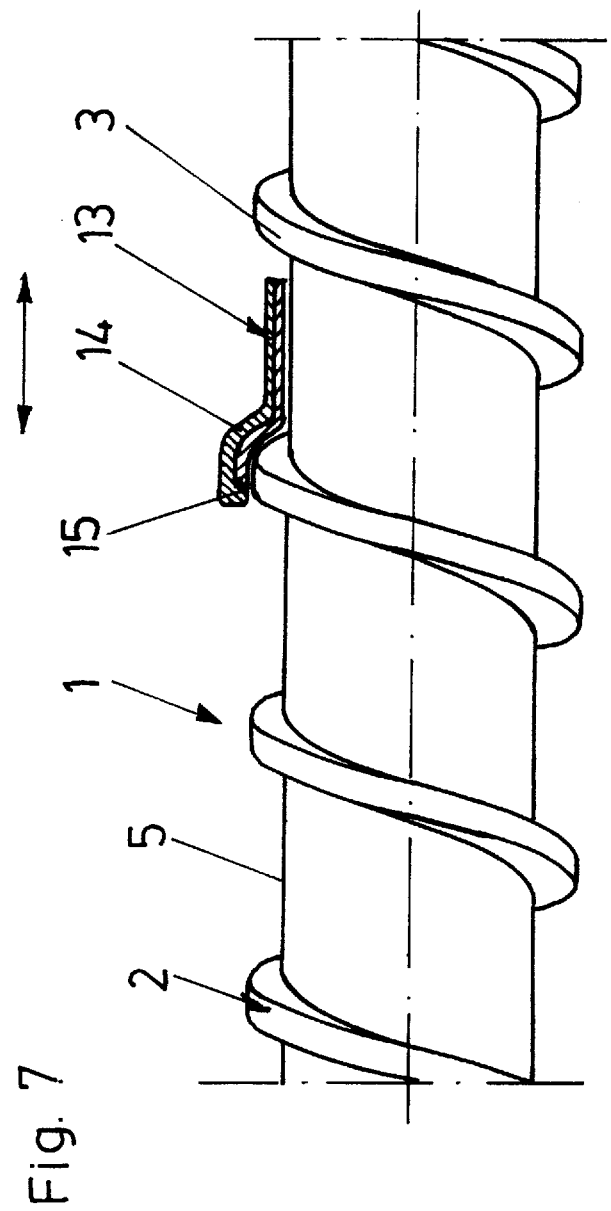
FIG. 7 is a view similar to FIG. 1a showing the main body of the screw with cover means according to the present invention.

Instead of or in addition to the shield 7 it is also possible to use a cover means as shown in FIG. 7, which covers the screw flight 2 and parts of the screw bottom 5. Advantageously two shields 7 which are spaced in the axial direction by the pitch of the screw flight 2 are moved in parallel so that only one flight flank 4 is free.

The cover means 13 advantageously has a silicone layer 14 which is carried by a carrier plate 15 of steel sheet. The cover means 13 is guided over the screw main body 1 with the same forward feed movement as the spray nozzle 6.

We claim:

1. A process for producing a coating on a surface of a screw for plasticizing in an injection molding machine in which a metal, carbide-metal or ceramic material is applied as the coating to a screw main body consisting of steel, by means of at least one spray jet using a high-speed flame spray process characterized in that in the coating operation the spray jet acts separately on a top side of a flight of the screw, and on flanks of the flight of the screw and on a bottom of the screw the top, flanks and bottom being acted on by the spray jet independently of each other, a mechanical bond being made between the screw main body (1) and the coating.

2. A process as set forth in claim 1 characterised in that firstly the flight flanks (4) and then the screw bottom (5) and the flight top side (3) are coated.

3. A process as set forth in claim 1 characterised in that edges (11) of the screw flight (2) are rounded.

4. A process as set forth in claim 3 characterised in that radii at the rounded edges (11) of the screw flights (2) are 0.1–0.8 mm.

5. A process as set forth in claim 1 characterised in that edges (11) of the screw flight (2) are provided with bevels.

6. A process as set forth in claim 5 characterized in that the bevels at the edges (11) of the screw flight (2) are 0.1 to 3 mm wide and inclined to the top of the flight of the screw by an angle of between 30 and 60 degrees.

7. A process as set forth in claim 1 characterized in that the surface of the screw main body (1) which is to be coated is cleaned of impurities in an ultrasonic bath prior to the high speed flame spraying operation.

8. A process as set forth in claim 1 characterized in that the surface of the screw main body (1) which is to be coated is cleaned of impurities manually by means of alcohol solutions prior to the high speed flame spraying operation.

9. A process as set forth in claim 8 characterised in that a sand blasting procedure follows the cleaning procedure, blasting agent used being iron-free electro-corundum in grain sizes of 0.3–1.5 mm.

10. A process as set forth in claim 1 characterised in that the coating operation is thermally regulated so that a maximum workpiece surface temperatures that occur are 150° C.

11. A process as set forth in claim 1 characterized in that the coating is applied to the main body of the screw by rotating the screw around its longitudinal axis and by translating the spray jet parallel to the longitudinal axis, the direction of rotation of the screw being changed at reversal points for movement of the spray jet, the reversal points being at opposite ends of each flight of the screw.

12. A process as set forth in claim 1 characterized in that for coating the flight flanks (4) the spray jet is guided a plurality of times axially and in opposite directions over the screw main body (1), with the screw main body (1) rotating, wherein the forward feed movement of the spray jet corresponds to a pitch of the screw flight (2) and a direction of rotation of the screw main body (1) is changed at reversal points of movement of the spray jet, which reversal points are at the ends of the flight and that after the operation of coating the flight flanks (4) has been effected the screw bottom (5) and the flight top side (3) are coated, wherein the spray jet is oriented at an angle of 90° relative to a longitudinal center line of the screw main body.

13. A process as set forth in claim 1 characterised in that for coating the flight flanks (4) the spray jet is guided a plurality of times axially and in oppositely directed working stroke motions over the screw main body (1), with the screw main body (1) rotating, wherein the spray jet is moved back in an idle condition to the starting point between two working stroke motions and the direction of rotation of the screw main body (1) is maintained irrespective of the direction of movement of the spray jet, and that after the operation of coating the flight flanks (4) has been effected the screw bottom (5) and the flight top side (3) are coated, wherein the burner nozzle (6) is oriented at an angle of 90° relative to the longitudinal center line of the screw main body.

14. A process as set forth in claim 1 characterised in that for coating the flight top side (3), the flight flanks (4) and the screw bottom (5) the spray jet is moved axially over the screw main body (1), the direction of the spray jet is changed at reversal points of its movement and the spray jet and longitudinal center line of the screw main body (1) make an angle of between 15° and 75°.

15. A process as set forth in claim 1 characterized in that the spray jet is focused by means of a shield system and the flight top (3) and the flight flanks (4) are coated such that linear motion of the spray jet is independent of rotation of the screw.

16. A process as set forth in claim 1 characterised in that portions of the screw main body (1) are protected by means of silicone cover means from the spray jet passing thereover.

17. A process as set forth in claim 1 characterized in that one or more of the following materials is or are used as the coating materials: Mo, Cr, Ni, Ti, Al, Co, Nb, W, Co—Ni, Co—Cr, Cr—Ni, and Co—Mo—Cr.

18. A process as set forth in claim 1 characterised in that the coating is applied in a layer thickness of 0.1–0.8 mm.

19. A process as set forth in claim 1 characterized in that the coated surfaces of the screw main body (1) are grinded after the coating has been applied, where the grinding is performed with tools of diamond or cubic boron nitride.

20. A process as set forth in claim 19 characterised in that the flight top side (3) is ground with a grinding wheel and the flight flanks (4) and the screw bottom (5) are ground with flexible bands, wherein at least three different grinding grain sizes are used.

21. A process as set forth in claim 1 characterised in that the coated plasticizing screws are subjected to torsional tests, wherein shear stresses of 180 N/mm$^2$ are induced at temperatures of 450° over at least 24 hours.

* * * * *